United States Patent [19]
Gerum

[11] 3,911,337
[45] Oct. 7, 1975

[54] DRIVING AND STABILIZING CIRCUIT FOR AN ELECTRO-MECHANICAL OSCILLATOR

[75] Inventor: Erich Gerum, Nuremberg, Germany

[73] Assignee: Diehl, Nuremberg, Germany

[22] Filed: Jan. 23, 1975

[21] Appl. No.: 543,451

[30] Foreign Application Priority Data
Jan. 29, 1974 Germany............................ 2404135

[52] U.S. Cl................................. 318/130; 58/23 A
[51] Int. Cl.².......................................... H02K 33/10
[58] Field of Search ........... 318/119, 126, 129, 130, 318/132; 331/116 R, 116 M; 58/23 A, 23 AC, 28 A

[56] References Cited
UNITED STATES PATENTS

| | | | |
|---|---|---|---|
| 3,701,052 | 10/1972 | Keller............................ | 58/23 AC X |
| 3,731,229 | 5/1973 | Keller............................ | 58/23 A X |
| 3,806,781 | 4/1974 | Berney........................... | 318/130 |

*Primary Examiner*—R. N. Envall, Jr.
*Attorney, Agent, or Firm*—Burns, Doane, Swecker & Mathis

[57] ABSTRACT

A driving and stabilizing circuit for a single coil electro-mechanical oscillator especially for the rate regulator of a time-piece. The single oscillator drive coil is connected between the terminals of a d.c. supply voltage in series relation to the collector-emitter electrodes of an operating transistor which is operatively switched between a conductive and nonconductive condition by a control transistor. A storage capacitor preceding the control input terminal of the control transistor is operatively connected to be loaded by a regulating circuit responding to voltage induced in the coil. The regulating circuit includes a regulating transistor having a base electrode connected to receive a bias voltage from a voltage divider between the terminals of the supply voltage, and having an emitter electrode operatively connected to the coil. The regulating circuit is also provided with an additional regulating means having a control input operatively connected to the coil and having a controlled output connected to the storage capacitor, the regulating transistor and the regulating means thereby responding variably to voltage conditions occurring in the circuit and tending to stabilize the oscillations of the oscillator in amplitude and frequency. In one embodiment, the additional regulating means comprises a further regulating transistor having a base electrode connected to the coil by way of a series dropping resistor and having collector-emitter electrodes connected in series relation to the storage capacitor between the terminals of the supply. In another embodiment, the additional regulating means comprises a further regulating transistor having a base electrode connected to the coil by way of an RC biasing circuit and being connected to cut off the control transistor in the conductive state of the further regulating transistor.

14 Claims, 3 Drawing Figures

DRIVING AND STABILIZING CIRCUIT FOR AN ELECTRO-MECHANICAL OSCILLATOR

BACKGROUND OF THE INVENTION

The invention relates to a driving and stabilizing circuit for a single coil electro-mechanical oscillator especially for the rate regulator of a time-piece and in particular to an improved regulating circuit for stabilizing the oscillation of the oscillator.

One known driving and stabilizing circuit for a single coil electromechanical oscillator employed as a rate regulator for a time-piece includes an operating transistor, a control transistor and a regulating transistor. The single coil is connected between the terminals of a d.c. supply voltage in series in relation to the collector-emitter electrodes of the operating transistor. The operating transistor is connected to be switched between conductive and nonconductive states by the control transistor, and a storage capacitor preceding the base or control input terminal of the control transistor is operatively connected to be loaded via a regulating circuit responding to the voltage induced in the coil. The regulating circuit has a regulating transistor, the base electrode of which is connected to a voltage divider between the terminals of the supply voltage and the emitter electrode of which is connected to the coil.

Whenever only one coil is utilized in the electro-mechanical oscillator, various advantages are achieved over a circuit which operates with two coils, e.g., one work coil and one control coil. However, essential characteristics such as, for example, the stabilization of the amplitude of the resonator, cannot be achieved using known two coil circuits.

Several requirements must be fulfilled by a circuit for the electromechanical oscillator of a time-piece. For example, the circuit must have a high degree of efficiency especially because the energy for the drive of the oscillator is taken mostly from a battery, the useful life of which is limited. The circuit is to stabilize changes in amplitude superposed on the oscillator for example by shocks. The circuit in addition should prevent the supply voltage from having an effect on the precision of the speed as the supply voltage decreases with the discharge of the battery. It is to be guaranteed that the oscillator starts up automatically from its rest position during application of the voltage and, in addition, the circuit is to have as few as possible electric contacts, so that it can be produced at a favorable price as an integrated circuit.

Numerous proposals have already been made for the solution of the problems occurring in case of stabilization. These arise particularly because, in case of the single coil circuit, there is no control coil and it is therefore difficult to obtain a signal from the coil which is a measure of the pertinent oscillation amplitude and is thus suitable as a control value.

OBJECTS AND SUMMARY OF THE INVENTION

It is accordingly a principal object of the present invention to fulfill the above mentioned requirements and at the same time to provide a stabilization of the oscillation which will not respond to changes in the supply voltage except when the supply voltage has already acted on the oscillator.

The foregoing is accomplished according to the present invention in connection with the above type of driving and stabilizing circuit by providing an additional regulating means, the control input of which is connected to the coil and the controlled output of which is connected to the storage capacitor, whereby the regulating transistor and the additional regulating means respond variably to the voltage phases occurring on the coil. Thus the regulating transistor is more or less conductive or cut off, depending on the voltage induced at the tap of the voltage divider or in the coil. The difference between the voltage tapped from the voltage divider and the pertinent coil voltage provides the base-emitter bias to the regulating transistor. Whenever this differential voltage is greater than the threshold value voltage of the transistor, then the regulating transistor is more or less conductive depending on the size of the difference voltage. As a result, the storage capacitor is more or less charged. Whenever the voltage difference is smaller than the threshold value of the transistor, especially whenever the work or operating transistor is turned on, then the regulating transistor is cut off and the capacitor discharges. Thus, a change in the supply voltage will have a direct affect on the capacitor charge, without the influence of the change of supply voltage being stabilized, with a delay only whenever the voltage induced in the coil has also been lowered.

The output of the additional regulating means is connected to the same terminal of the storage capacitor as the collector electrode of the regulating transistor, and thus also to the base electrode of the control transistor. The additional regulating means cuts off in the oscillator phase in which the regulating transistor is conducting. The regulating means has a decisive influence on the end of the conductive state of the control transistor and of the operating transistor, i.e., on the duration of the driving pulse.

In a preferred embodiment, the additional regulating means comprises a transistor having a base electrode connected to the driving coil possibly by way of a dropping resistor, and having collector-emitter electrodes connected in series in relation to the storage capacitor between the terminals of the supply voltage. With this circuit it will be gauranteed that the oscillator will start up reliably in case of all kinds of possible voltage values of the supply voltage, especially between 1.7 v and 1.1 v. This further development of the invention starts out from the realization that an automatic start is always made difficult whenever the sweep frequency of the circuit — which occurs in a pure form whenever the oscillator is at a standstill — and the mechanical natural frequency of the oscillator are at an unfavorable ratio. A particularly unfavorable ratio exists for example, whenever the sweep frequency is twice as high as the natural frequency of the oscillator since then the oscillator can be acted upon by, for example, a positive pulse both in its negative as well as in its positive phase. This means, that the oscillator is indeed driven in one phase, but is again slowed down (braked) in the other phase. If a specific value of the supply voltage is available it is possible to design the circuit such that the sweep frequency and the natural frequency are at a favorable ratio. However, if a change in the supply voltage occurs, then the sweep frequency in case of the known circuits changes in such a way that it is no longer capable to start the oscillator reliably. This is where the invention is particularly advantageous.

The foregoing will become apparent to one skilled in the art to which the invention pertains from the follow- 3,911,337

DETAILED DESCRIPTION

FIG. 1 Embodiment

Figure 1:
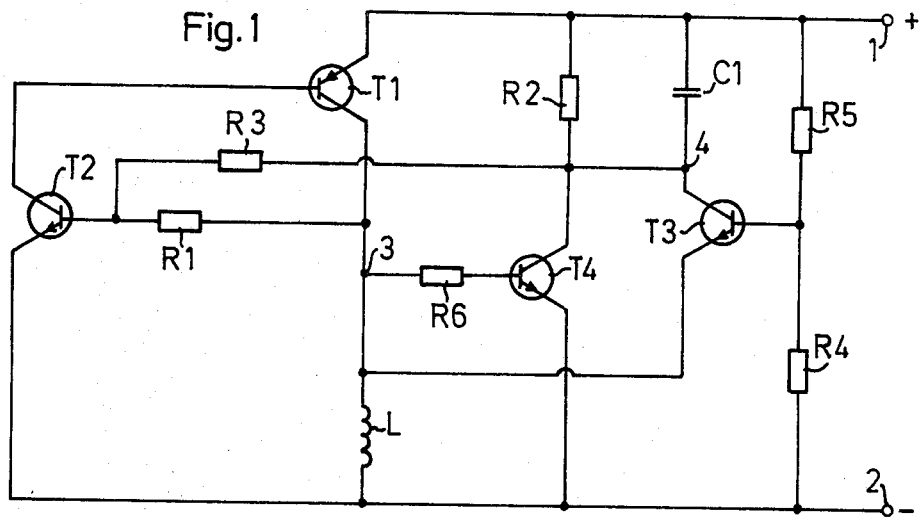
FIG. 1 is a schematic circuit diagram illustrating one embodiment of the driving and stabilizing circuit according to the present invention.

Referring now to FIG. 1, the emitter-collector electrodes of an operating or work transistor, T 1 and a coil L are series connected between the terminals 1 and 2 of a supply voltage such as a 1.5 volt battery. The coil L forms part of a mechanical oscillator, for example, through the use of a magnet attached to a mechanical oscillator and disposed in the coil L. These latter details of the mechanical oscillator are conventional and are not shown in the drawings.

The base electrode of the operating transistor T 1 is connected to the collector electrode of a control transistor T 2, the emitter electrode of which is connected to the same terminal 2 of the supply voltage as is the coil L. The base electrode of the control transistor T 2 is connected by way of a resistor R 1 to a junction 3 between the coil L and the collector electrode of the work transistor T 1. Furthermore, the base electrode of the transistor T 2 is connected to terminal 1 by way of two resistors R 2 and R 3. A storage capacitor C 1 is connected in parallel with the resistor R 2, between the terminal 1 and a junction 4 between the resistors R 2 and R 3.

The collector-emitter electrodes of a regulating transistor T 3 are connected between the junctions 3 and 4 and therefore between the coil L and the capacitor C 1 with the emitter electrode connected to the coil L. The base electrode of the regulating transistor T 3 is connected to a junction between two series connected resistors R 4 and R 5. The resistors R 4 and R 5 constitute a voltage divider between the supply terminals 1 and 2. Furthermore, the collector electrode of an additional regulating transistor T 4, whose emitter electrode is connected to terminal 2, is connected to the junction 4. The base electrode of the transistor T 4 is connected to junction 3 and thus to the coil L by way of a resistor R 6.

Whenever the circuit is made as an integrated circuit, then only four connections are necessary, those connection corresponding to the points 1–4, since only the coil, the capacitor and naturally the battery must be connected as separate elements.

Self-Starting Operation

In operation, the circuit of FIG. 1 is connected to the supply voltage with the polarity as shown in FIG. 1. Initially at start up it may be assumed that no voltage is induced in coil L, and thus the oscillator is at a standstill. The supply voltage is connected to the terminals 1 and 2 and a base bias voltage appears at the base electrode of the control transistor T 2 by way of resistors R 2, R 3 and R 1 and the ohmic resistance of the coil L, which turns the transistor T 2 on. As a result, the work transistor T 1 becomes conductive.

A current flows through the coil L which deflects the magnet (not shown) and thus the oscillator. The regulating transistor T 3 is locked or cut off (nonconductive) and the regulating transistor T 4 is conductive, so that the hitherto discharged storage capacitor C 1 is charged in the direction of the potential of the terminal 2 by way of the regulating transistor T 4. As a result, the base voltage of the control transistor T 2 drops and the transistor T 2 consequently cuts off with a delay. The work transistor T 1 also cuts off. The field which had built up in the coil L breaks down and produces a short self-induction pulse. This pulse cuts off the regulating transistor T 4 and triggers the regulating transistor T 3 into conduction temporarily. The capacitor C 1 at the same time is charged almost to the battery voltage.

The oscillator returns as a result of its return energy to its starting position and swings out beyond that, depending on its previous deflection. The storage capacitor C 1 discharges by way of the discharge resistor R 2 until a voltage occurs again on the base of the control transistor T 2, which opens or turns on the latter, as a result of which the work transistor T 1 also becomes conductive. The processes just described are repeated until the oscillator has been built-up, i.e., is in steady state running condition. Of course, the switching frequency of the work transistor T 1 — the sweep frequency — must be dimensioned such that the work transistor T 1 does not become conductive for the second time when the oscillator swings through its second reversing point, being opposite the first reversing point, since this would signify a complete braking of the desired self-start of the oscillator. It will thus be appreciated that the values of the various circuit elements may be selected, for a particular oscillator driving coil, with this factor in mind.

Assuming that the supply voltage is smaller in comparison to the just described case during the self-start, but is sufficient to turn on the work transistor T 1, there is only a smaller base voltage at the control transistor T 4 than before. The storage capacitor C 1 thus charges less and more slowly to the potential of the terminal 2. In connection therewith however, the storage capacitor C 1 also discharges more quickly to the voltage at which the control transistor T 2 and thus also the work transistor T 1 cuts off. Thus on the one hand the pulse duration, i.e., the time during which the work transistor T 1 is conductive, is extended, and on the other hand the time during which the work transistor T 1 is cut off, is shortened. This means, that in case of changes in the battery voltage, both the energy fed to the oscillator (product of level of impulse and duration of impulse) as well as the sweep frequency (pulse interval) of the circuit are stabilized on the basis of the regulating transistor T 4. Proper starting of the circuit is therefore assured in case of all occurring voltage values.

Steady State Operation

With continued reference to FIG. 1, the functioning of the described circuit of FIG. 1 in the built-up or steady state of the oscillator is as follows. An approximately sinusoidal shaped voltage is induced by the oscillation of the magnet of the oscillator in the coil L. The potential at the peak value of the positive half-cycle lies above the potential at terminal 2 and below the potential at terminal 1 and the potential at the peak value of the negative half-cycle lies below the potential at terminal 2.

The regulating transistor T 3 conducts during the negative half-cycle. The control transistor T 2 and the work transistor T 1 are locked or cut off and the storage capacitor C 1 is charged. The voltage to which the storage capacitor C 1 is charged is essentially proportional to the peak value of the negative half-cycle of the voltage induced in the coil L as a result of the input-characteristic line of the transistor T 3. If then the voltage induced in coil L passes over into its positive half-cycle, then the regulation transistor T 3 cuts off. The storage capacitor C 1 discharges by way of the discharge resistor R 2, until the potential at point 4 has become sufficiently positive that the control transistor T 2 and thus also the work transistor T 1 are turned on. Now a positive impulse is superimposed on the positive half-cycle, which serves for maintaining the oscillation of the oscillator. This impulse is terminated by the potential at point 4 becoming so strongly negative, that the control transistor T 2 and the operating transistor T 1 cut off. In the regular case, however, during the positive half-cycle, especially during the time of conduction by the work transistor T 1, the regulating transistor T 4 becomes conductive, as a result of which the voltage at point 4 is reduced, so that the control transistor T 2 and thus the work transistor T 1 will cut off.

With the circuit of the present invention, the amplitude of oscillations of the oscillator, i.e., of the voltage induced in coil L, is stabilized. This can be seen from the following discussion starting with the assumption that a particularly high voltage is induced in the coil L.

With continued reference to FIG. 1 the storage capacitor C 1 is charged more strongly during the particularly high negative half-cycle of induced coil voltage. During the positive half-cycle, the capacitor discharges to the voltage at which the control transistor T 2 is turned on and the discharge time lasts longer, i.e., the driving impulse to the coil L begins later. Simultaneously the regulating transistor T 4 — on the basis of the likewise reinforced positive half-cycle — becomes conductive sooner, so that all together the duration of the impulse is shortened. In the border case, i.e., in case of a particularly strong oscillator amplitude, (for example, extremely strong oscillations caused by strong shocks) no driving impulse occurs during the positive half-cycle because the storage capacitor C 1 does not discharge to the point where the control transistor T 2 and thus the work transistor T 1 are turned on, prior to the conduction of regulating transistor T 4. Under such conditions, the control transistor T 2 is kept in a cut off state and the oscillation is not reinforced.

This can be contrasted to the situation in which the voltage induced in the coil is particularly low and the storage capacitor C 1 is charged only a little. The control transistor T 2 becomes conductive correspondingly sooner during the positive half-cycle and the regulating transistor T 4 conducts correspondingly later. Altogether, the width of the impulse and thus the driving energy acting on the coil of the oscillator is increased as a result.

The energy required for the drive of the mechanical oscillator must also be increased whenever the supply voltage drops. Accordingly, in case of a lowered supply voltage, the duration of the driving impulse must be extended. With the circuit of the present invention, a drop in the supply voltage is also followed by a drop in the voltage on the base electrode of the regulating transistor T 3. This means that the regulating transistor T 3 will be less conductive during steady state operation in response to the induced voltage occurring in the negative half-cycle, so that the storage capacitor C 1 is less negatively charged. Consequently, the capacitor C 1 will discharge more quickly down to the voltage at which the control transistor T 2 conducts, so that the pulse supplied to the coil L via the work transistor T 1 starts earlier. At the same time the regulating transistor T 4, because of the reduced supply voltage, becomes conductive later, so that the end of the pulse occurs later. Altogether, therefore the work pulse will be extended under lower supply voltage conditions.

It will be appreciated that in order to achieve the above described regulating function, the regulating transistors T 3 and T 4 are to operate mainly in the linear area of their characteristic curves whenever they are not cut off.

Figure 3:
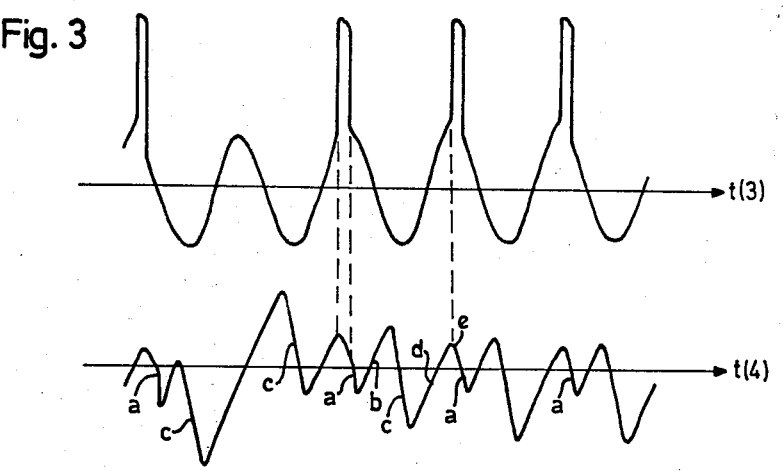

The voltage conditions during a few periods are shown in detail in FIG. 3. The upper diagram in FIG. 3 represents the waveform of the voltage at point 3 and the lower diagram the waveform of the voltage at point 4 of the circuit. In the recording of the diagrams, the oscillator had been uncoupled from the load of the mechanical construction units to be driven by it. In the diagram recorded at point 3, one can see that driving pulses are superposed on the positive half-cycles of the sinusoidal voltage induced in the coil. The sharp pulse occurring in the coil L as a result of self-induction cannot be recognized in the upper diagram. Its effect, however, is shown in the lower diagram as the temporary reinforced voltage drop $a$. During this voltage drop $a$, the regulating transistor T 3 is conductive and the storage capacitor C 1 is charged in a negative direction. With termination of this sharp pulse, the regulating transistor T 3 is cut off again, and the storage capacitor is discharged in a positive direction via the resistor R 2.

The voltage charge at point 3 during the discharge period is as shown at $b$. During this discharge of the storage capacitor C 1 the control transistor T 2 cannot be turned on. Therefore no driving pulse can occur either since the negative half-cycle of the induced coil voltage at point 3 is applied at the same time to the base of the control transistor T 2 via the resistor R 1. This discharge of the storage capacitor C 1 is terminated by the regulating transistor T 3 being turned on again, whenever the negative half-cycle has reached a certain voltage value, and thus the storage capacitor C 1 is again charged in a negative direction (voltage charge indicated at $c$).

After cut off of the regulating transistor T 3, the storage capacitor C 1 is discharged via the resistor R 2 (voltage charge indicated at $d$). Since the positive half-cycle is applied to the base electrode of the control transistor T 2 in the course of this second discharge, the transistor T 2 can be turned on, so that the driving pulse starts. The high voltage now provided at point 3 makes the further regulating transistor T 4 conductive, so that the voltage at point 4 drops as indicated at $e$. This results in the cut off of the control transistor T 2 and thus results in a termination of the driving pulse. The breakdown of the field, created by the driving pulse in the coil, leads to the previously described sharp pulse $a$.

Apparently the charging states of the storage capacitor C 1 depends on the level of the supply voltage, as well as on the level of the voltage induced in the coil, so that altogether the described stabilization of the oscillator can be achieved.

In FIG. 3 no driving pulse is superposed on the second positive half-cycle of the sinusoidal voltage induced in the coil L. This can be attributed to the fact that the oscillation amplitude of the oscillator was reinforced in the preceding negative half-cycle. The circuit already responds to such small changes in amplitudes, as can not be seen with the scale in FIG. 3. Because of the reinforced oscillation in the negative half-cycle, the storage capacitor C 1 is charged up to a strong negative value and discharges correspondingly more slowly toward the positive value at which the control transistor T 2 is turned on.

In the illustrated example, the control transistor T 2 is not turned on since, before reaching this positive value, the negative half-cycle is already applied again to the capacitor and to the base electrode of the control transistor T 2 via the resistor R 1. It can thus be seen that in case of a reinforced oscillator amplitude no work pulse is delivered to the oscillator, a result which is within the sense of the desired regulation.

FIG. 2 Embodiment

Figure 2:
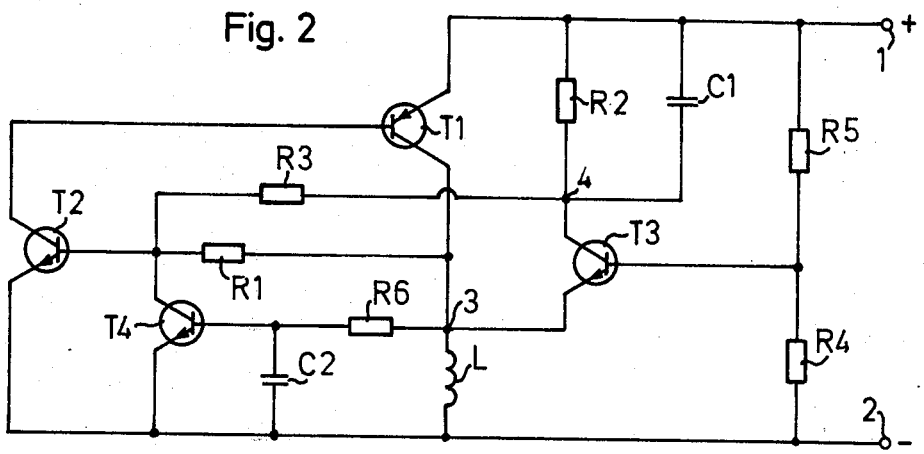
FIG. 2 is a schematic circuit diagram illustrating another embodiment of the circuit according to the present invention; and, FIG. 3 is a diagram illustrating the voltage waveforms at the points 3 and 4 of the circuit of FIG. 1.

Another embodiment of the invention is illustrated in FIG. 2. The FIG. 2 embodiment differs from the circuit according to FIG. 1 in circuit structure with regard to an altered arrangement of the additional regulating transistor T 4. The collector electrode of the regulating transistor T 4 is connected directly to the base electrode of the control transistor T 2. An RC circuit comprising the resistor R 6 and a capacitor C 2 is provided between the base electrode of the transistor T 4 and the junction 3. The value of the resistor R 6 is comparatively smaller than that of the resistor R 6 in the circuit of FIG. 1. The remaining circuit structurally resembles the one described in connection with FIG. 1.

The operation of the FIG. 2 embodiment during the negative half-cycle of the voltage induced in the coil L corresponds to the operation of the FIG. 1 embodiment described above. During the positive half-cycle, the capacitor C 2 is charged via the resistor R 6, until the transistor T 4 conducts and thus the control transistor T 2 is cut off. As a result, the driving pulse is terminated. It will be appreciated that the charging of the capacitor C 2 takes longer at a reduced oscillator amplitude, so that the conduction of the transistor T 4 and thus the end of the pulse will occur later. Therefore the duration of the pulse is extended at reduced oscillator amplitude so that more energy is fed to the oscillator under such conditions. The operation under other conditions also functionally corresponds to that of the FIG. 1 embodiment and accordingly will not be described in detail.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving and stabilizing circuit for a single coil electromechanical oscillator especially for the rate regulator of a time-piece, the single coil being connected between the terminals of a d.c. supply voltage in series relation to the collector-emitter electrodes of an operating transistor, the operating transistor being operatively switched between a conductive and nonconductive condition by a control transistor, said circuit including a storage capacitor preceding the control input terminal of the control transistor, said capacitor being operatively connected to be loaded by a regulating circuit responding to voltage induced in the coil, the regulating circuit comprising a regulating transistor having a base electrode connected to receive a bias voltage from a voltage divider between the terminals of the supply voltage and having an emitter electrode operatively connected to the coil, and an additional regulating means having a control input operatively connected to the coil and having a controlled output connected to the storage capacitor, the regulating transistor and the regulating means thereby responding variably to voltage conditions occurring in the circuit and tending to stabilize the oscillations of the oscillator in amplitude and frequency.

2. The circuit of claim 1 wherein the voltage divider comprises a plurality of ohmic resistors connected to the supply voltage such that the regulating transistor is less conductive in dependence on the voltage induced in the coil in response to a drop in the supply voltage connected to the voltage divider.

3. The circuit of claim 2 wherein the storage capacitor, the collector-emitter electrodes of the regulating transistor and the coil are connected in series between the terminals of the voltage supply.

4. The circuit of claim 3 including a discharge resistor connected in parallel to the storage capacitor.

5. The circuit of claim 4 wherein said discharge resistor is connected with first and second resistors as part of a further voltage divider, said further voltage divider supplying a bias voltage to the control transistor, said first resistor of the voltage divider being connected between the base electrode of the control transistor and the storage capacitor and said second resistor of said voltage divider being connected between the base electrode of the control transistor and the coil.

6. The circuit of claim 5 wherein said regulating transistor is biased to operate in the linear range of the characteristic curve in its conductive state.

7. The circuit of claim 6 wherein said additional regulating means comprises a further regulating transistor having a base electrode connected to the coil by way of a series dropping resistor and having collector-emitter electrodes connected in series in relation to the storage capacitor between the terminals of the supply voltage.

8. The circuit of claim 7 wherein said further regulating transistor is biased to operate in the linear range of the characteristic curve in its conductive state.

9. The circuit of claim 6 wherein said additional regulating means comprises a further regulating transistor having a base electrode connected by way of an RC biasing circuit to the coil, said further regulating transistor being connected to cut off said control transistor in the conductive state of said further regulating transistor.

10. The circuit of claim 1 wherein said additional regulating means comprises a further regulating transistor having a base electrode connected by way of a series connected current limiting resistor to the coil and having collector-emitter electrodes connected in series in relation to the storage capacitor between the terminals of the supply voltage.

11. The circuit of claim 10 wherein said further regulating transistor is biased to operate in the linear range of the characteristic curve in its conductive state.

12. The circuit of claim 10 including a discharge resistor connected in parallel to said storage capacitor, said discharge resistor being connected with first and second resistors as part of a further voltage divider, said further voltage divider supplying a bias voltage to the control transistor, said first resistor of the voltage divider being connected between the base electrode of the control transistor and the storage capacitor and said second resistor of said voltage divider being connected between the base electrode of the control transistor and the coil.

13. The circuit of claim 10 wherein the voltage divider comprises a plurality of ohmic resistors connected to the supply voltage such that the regulating transistor is less conductive in dependence on the voltage induced in the coil in response to a drop in the supply voltage connected to the voltage divider.

14. The circuit of claim 1 wherein said addition regulating means comprises a further regulating transistor having a base electrode connected by way of an RC biasing circuit to the coil, said further regulating transistor being connected to cut off said control transistor in the conductive state of said further regulating transistor.

* * * * *